United States Patent [19]

Tsuchiya et al.

[11] Patent Number: 4,943,892
[45] Date of Patent: Jul. 24, 1990

[54] SOLID ELECTROLYTIC CAPACITOR AND METHOD FOR MANUFACTURING THE SAME

[75] Inventors: Sohji Tsuchiya, Kanagawa; Yasuo Kudoh, Yokohama; Toshikuni Kojima, Kawasaki; Masao Fukuyama; Susumu Yoshimura, both of Yokohama, all of Japan

[73] Assignee: Matsushita Electric Industrial Co., Ltd., Osaka, Japan

[21] Appl. No.: 331,204

[22] Filed: Mar. 31, 1989

[30] Foreign Application Priority Data

| | | |
|---|---|---|
| Mar. 31, 1988 [JP] | Japan | 63-80770 |
| Jun. 9, 1988 [JP] | Japan | 63-142136 |
| Jun. 9, 1988 [JP] | Japan | 63-142137 |
| Sep. 9, 1988 [JP] | Japan | 63-227022 |
| Feb. 20, 1989 [JP] | Japan | 1-39910 |

[51] Int. Cl.$^5$ .................. H01G 9/00; B01J 17/00
[52] U.S. Cl. ..................... 361/525; 29/25.03
[58] Field of Search .......... 29/570.1; 361/523, 525, 361/527

[56] References Cited

U.S. PATENT DOCUMENTS

| | | | |
|---|---|---|---|
| 3,454,473 | 7/1969 | Minami et al. | 29/570.1 X |
| 3,621,342 | 11/1971 | Yoshimura et al. | 29/570.1 X |
| 4,009,424 | 2/1977 | Itoh | 361/527 |
| 4,105,513 | 8/1978 | Nishino et al. | 29/570.1 X |
| 4,580,855 | 4/1986 | Niwa | 361/525 |
| 4,785,380 | 11/1988 | Harakawa et al. | 361/525 |
| 4,803,596 | 2/1989 | Hellwig et al. | 29/570.1 X |

FOREIGN PATENT DOCUMENTS

| | | |
|---|---|---|
| 3811415 | 10/1988 | Fed. Rep. of Germany . |
| 2128820 | 10/1972 | France . |
| 58-17609 | 2/1983 | Japan . |
| 60-37114 | 2/1985 | Japan . |
| 61-47625 | 3/1986 | Japan . |
| 62-181415 | 8/1987 | Japan . |
| 1-74713 | 3/1989 | Japan . |

Primary Examiner—Donald A. Griffin
Attorney, Agent, or Firm—Lowe, Price, LeBlanc, Becker & Shur

[57] ABSTRACT

A solid electrolytic capacitor comprising a capacitor element which includes a valve metal member capable of forming a dielectric oxide film thereon, a dielectric oxide film formed on the valve metal member, a manganese oxide layer formed on the dielectric oxide film, a conductive polymer film formed on the manganese oxide film by electrolytic polymerization, and terminals formed on the valve metal member and the conductive polymer film, respectively. The solid electrolytic capacitor is improved in capacitor characteristics. A method for manufacturing the solid electrolyte is also described wherein the conductive polymer film is readily formed on the manganese dioxide layer.

25 Claims, 3 Drawing Sheets

SOLID ELECTROLYTIC CAPACITOR AND METHOD FOR MANUFACTURING THE SAME

BACKGROUND OF THE INVENTION

1. Field of the Invention

This invention relates to a solid electrolytic capacitor having good capacitor characteristics, particularly good high frequency characteristics. The invention also relates to a method for the manufacture of the capacitor mentioned above.

2. Description of the Prior Art

In recent trends toward digitalization of electric and electronic appliances, there is a strong demand of capacitors which exhibit a low impedance in a high frequency range and are small in size and large in capacitance.

Known capacitors for high frequency service include, for example, plastic film capacitors, mica capacitors, layer-built ceramic capacitors and the like. Among them, the film and mica capacitors are so large in size that a difficulty is encountered in obtaining large capacitance. With the layer-built ceramic capacitors, temperature characteristics become poorer when they are manufactured to have a smaller size and a larger capacitance coupled with another disadvantage that such capacitors become very expensive.

On the other hand, a certain type of capacitor is known as having large capacitance. Such a capacitor includes, for example, an aluminium dry electrolytic capacitor and an aluminium or tantalum solid electrolytic capacitor. These electrolytic capacitors are advantageous in that since an anodized film serving as a dielectric layer can be formed very thinly, a large capacitance can be imparted to the capacitors. On the contrary, the anodized film is liable to damage, so that it becomes necessary to provide an electrolyte between the anodized film and a cathode in order to repair the defects. With aluminium dry electrolytic capacitors, anode and cathode aluminium foils which have been etched, respectively, are convolutely wound through a paper separator and a liquid electrolyte is impregnated in the separator. This is disadvantageous in that the electrostatic capacitance decreases and the loss (tan δ) increases owing to the leakage or evaporation of the liquid electrolyte and in that high frequency characteristics and low temperature characteristics are not good due to the ionic conductivity of the electrolyte.

In order to overcome the disadvantages of the aluminium dry electrolytic capacitors, manganese dioxide is used as a solid electrolyte in the aluminium or tantalum solid electrolytic capacitors. This solid electrolyte is obtained by immersing an anode element in an aqueous manganese nitrate solution and thermally decomposing the nitrate at a temperature of from 250° to 350° C. Since the electrolyte is solid, the drawbacks such as a lowering of the performance caused by the effluent of the electrolyte at high temperatures or by coagulation of the electrolyte at low temperatures can be avoided. The solid electrolytic capacitors exhibit better frequency and temperature characteristics than capacitors using liquid electrolytes. However, such solid electrolytic capacitors are undesirably higher by one or more orders of magnitude with respect to impedance or tan δ in a high frequency range than layer-built ceramic capacitors or plastic film capacitors. This is because of the damage of the oxide film during the thermal decomposition of manganese nitrate and the high specific resistance of the resultant manganese dioxide.

In order to solve the above problem, there has been proposed use of organic semiconductors having good anodizability such as a 7,7,8,8-tetracyanoquinodimethane complex (hereinafter referred to simply as TCNQ complex). The organic semiconductor may be impregnated between a counter electrode and the oxide film after dissolution in organic solvent or melting by heating. Accordingly, the damage of the oxide film as will occur during the thermal decomposition of manganese nitrate can be prevented. The TCNQ complexes have high conductivity, good anodizing properties and good high frequency characteristics, with the possibility of making a capacitor with a large capacitance.

For instance, Japanese Laid-open Patent Application No. 58-17609 describes the use of a solid electrolyte which is made of an organic semiconductor comprised of N-n-propyl or N-isopropylisoquinoline and TCNQ complexes. According to this patent application, the impregnation of the TCNQ salt in a convolutely wound aluminium electrolytic capacitor is carried out by application of a melt of the TCNQ salt, thereby firmly bonding the TCNQ salt and the oxide film together. The resultant aluminium capacitor is stated as being significantly improved in frequency and temperature characteristics owing to the high conductivity of the TCNQ salt. Since the TCNQ salt has higher conductivity and better anodizing ability (repairing ability) than manganese dioxide, one is enabled to make a capacitor whose frequency and temperature characteristics are better than solid electrolytic capacitors using manganese dioxide. The TCNQ salts used in the patent application contain an isoquinolium cation which is substituted with an alkyl group at the N position. This salt is impregnated in the oxide film after heat melting.

In recent years, there have been proposed solid electrolytic capacitors wherein highly conductive polymers obtained by polymerizing heterocyclic monomers such as pyrrole, thiophene and the like are formed on an anode for used as an electrolyte (Japanese Laid-open Patent Application Nos. 60-37114 and 61-47625).

According to electrolytic polymerization, a dense conductive polymer film may be readily formed, on an ordinary anode such as platinum, carbon or the like, from a solution of pyrrole, thiophene or derivatives thereof and an appropriate support electrolyte. However, the formation of a conductive polymer on an anode having an oxide film by the electrolytic polymerization is principally difficult since any electric current does not pass. Although a conductive polymer film may be formed on the oxide film-free surface of a valve metal by the electrolytic polymerization, anodic conversion treatment through the conductive polymer film is essential. This will cause the previously formed conductive polymer film to be changed in quality or deteriorate, or may be separated from the anode surface, thus leading to a lowering of the characteristics of the capacitor.

The formation of a conductive polymer may be possible by the use of oxidation polymerization. The resultant polymer is in the form of powder and is poor in adhesion to an anode having an oxide film. Accordingly, such a polymer is difficult to utilize as an electrolyte for capacitor.

SUMMARY OF THE INVENTION

It is therefore an object of the present invention to provide a solid electrolytic capacitor which comprises a capacitor element having a conductive polymer film formed on an anodized film of a valve metal whereby the capacitor has good frequency and temperature characteristics with high reliability.

It is another object of the invention to provide a method for manufacturing a solid electrolytic capacitor of the type mentioned above.

It is a further object of the invention to provide a method for manufacturing a solid electrolytic capacitor wherein a fraction defect caused by leakage current can be lowered with an improved yield of the capacitor.

It is a still further object of the invention to provide a method for manufacturing a solid electrolytic capacitor wherein a conductive polymer film is formed on an anodized film through a manganese oxide film thereby causing the electrolytic polymerization to proceed smoothly.

According to one embodiment of the invention, there is provided a solid electrolytic capacitor which comprises a valve metal member capable of forming a dielectric oxide film thereon, a dielectric oxide film formed on the valve metal member, a manganese oxide film formed on the dielectric oxide film, a conductive polymer film formed on the manganese oxide film by electrolytic polymerization, and terminals formed on the valve metal member and the conductive polymer film, respectively.

According to another embodiment of the invention, there is also provided a method for manufacturing a solid electrolytic capacitor which comprises providing a valve metal member, forming an anodized film on the valve metal member, forming a manganese oxide film on the anodized film, subjecting a monomer capable of forming a conductive polymer to electrolytic polymerization thereby forming a conductive polymer film on the manganese oxide film, and attaching terminals to the valve metal member and the conductive polymer film, respectively. Preferably, after the formation of the conductive polymer film, the anodized film is again subjected to chemical conversion treatment to repair the film.

BRIEF DESCRIPTION OF THE DRAWINGS

FIGS. 2a, 2b and 3 are, respectively, illustrative of a procedure of manufacturing a solid electrolytic capacitor of the type particularly shown in FIG. 1a.

DETAILED DESCRIPTION AND EMBODIMENTS OF THE INVENTION

Figure 1A:
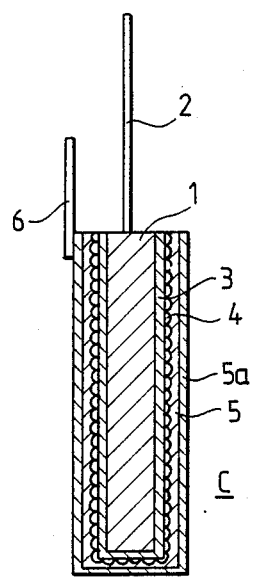
FIGS. 1a and 1b are, respectively, a solid electrolytic capacitor according to one embodiment of the invention.
Figure 1B:
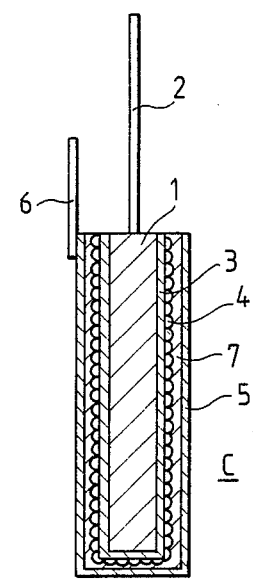
Figure 2A:
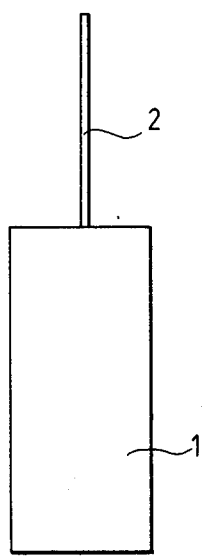
Figure 2B:
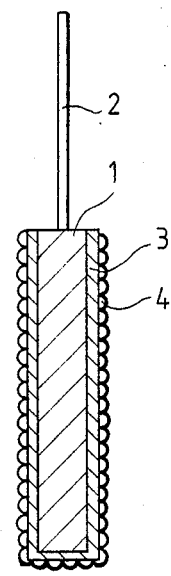
Figure 3:
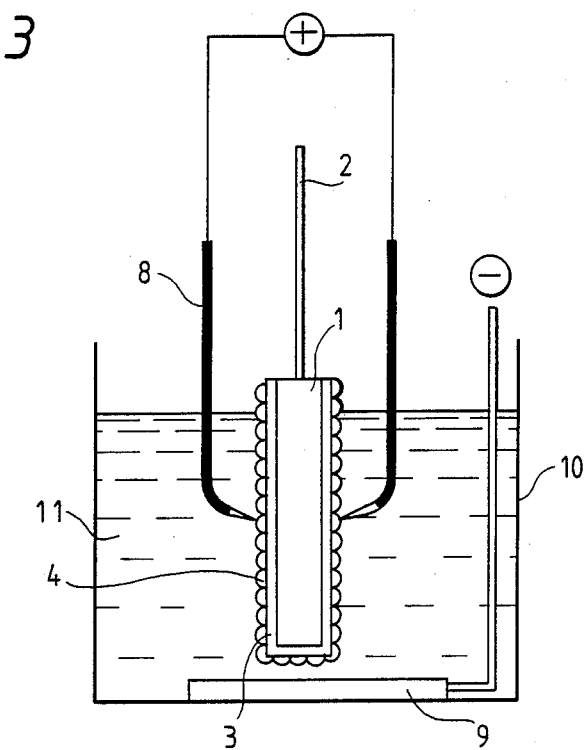

Reference is now made to the accompanying drawings wherein like reference numerals indicate like parts or members and particularly, to FIGS. 1 through 3. In FIGS. 1a and 1b, there is generally shown a solid electrolytic capacitor element C according to the present invention. The capacitor element C includes a valve metal foil 1 having a terminal or positive lead electrode 2. The metal foil 1 has an anodized film 3 on the surface thereof, and a manganese dioxide ($MnO_2$) film 4. On the manganese dioxide film 4 is formed a conductive polymer film 5 which has a terminal or negative lead electrode 6. The lead electrode 6 may be formed through a conductive layer 5a formed on the conductive polymer film 5, but is usually attached directly to the polymer film by a suitable means such as a silver or graphite paste. The valve metal used as the foil 1 is, for example, aluminium or tantalum and may be in the form of not only a foil, but also a plate or sheet. In addition, a sintered product of Al or Ta may also be used instead of the foil. The manganese oxide film is formed to cause electrolytic polymerization to proceed smoothly with good adhesion of the conductive polymer film. The manganese dioxide film is not necessarily formed continuosly or entirely over the anodized film, but may be formed as islands as will be discussed hereinafter.

The conductive polymer is formed on the manganese dioxide by electrolytic oxidation polymerization of an electrolytically polymerizable monomer used in combination with a support electrolyte. Examples of such monomers include pyrrole or its derivatives having a substituent at the 3 and/or 4 position thereof, a dimer of pyrrole or bipyrrole, thiophene or its derivatives having a substituent at the 3 and/or 4 position thereof, a dimer of thiophene or bithiophene, or a trimer of thiophene or terthienyl, and the like. Examples of the substituent for both pyrrole and thiophene derivatives include a lower alkyl group such as methyl, a lower alkoxy group such as methoxy, ethoxy or the like, an aryl group such as phenyl, and the like.

The support electrolytes may be any known support electrolytes and include, for example, inorganic compounds of anions such as $ClO_4^-$, $BF_4^-$ or $PF_6^-$ and cations of ammonium, an alkali metal or the like, organic compounds such as aliphatic acids including formic acid, oxalic acid and the like and salts thereof, aromatic carboxylic acids and salts such as salicylic acid, benzoic acid and their salts, organic sulfonic acids such as toluenesulfonic acid, naphthalene sulfonic acid and their salts as is known in the art.

The negative lead electrode is attached to the polymer film by means of, for example, a carbon or silver paste. The capacitor element may be covered, for example, with a resin such as a cured epoxy resin, or may be encased in a suitable case.

In order to completely suppress defects involved during formation of the conductive polymer film as will be discussed hereinafter, an insulating polymer film 7 may be formed on the manganese dioxide film, as is particularly shown in FIG. 1b, prior to the formation of the conductive polymer film 5. Such an insulating polymer film 7 may be formed by electrolytic reduction polymerization and is prepared from a monomer including acrylic esters such as methyl acrylate, ethyl acrylate and the like, methacrylic esters such as methyl methacrylate, ethyl methacrylate and the like, methacrylonitrile, methacrylamide, acrylonitrile, acrylamide and the like. The monomer is polymerized on the $MnO_2$ film to form an insulating or non-conductive polymer film.

Fabrication of the solid electrolytic capacitor C is described.

In FIGS. 2a, 2b and 3, there is shown a procedure of fabricating the solid electrolytic capacitor. As shown in FIG. 2a, a valve metal foil 1 having a positive lead electrode 2 for the capacitor is first provided. This foil 1 is subjected to etching by any known procedures to increase the surface area. The etched foil is subsequently anodized by immersion in an aqueous acid solution to form an oxide film 3 on the surface of the foil 1 as shown in FIG. 2b. The anodization is effected by an ordinary electrochemical procedure. The acid used for this purpose may be an inorganic acid such as phosphoric acid or an organic acid such as oxalic acid, adipic acid or the like. If the valve metal is aluminium, $Al_2O_3$ is formed on the foil surface. Alternatively, if tantalum is used, $Ta_2O_5$ is formed as the oxide film 3. The foil 1 on which the anodized film 3 has been formed is immersed in an aqueous solution of a water-soluble manganese compound for a given time and dried in air at 200° to 300° C. thereby thermally decomposing the nitrate into manganese dioxide to form a manganese dioxide film 4 on the anodized film 3. For the drying, the air may be humidified in order to cause the thermal decomposition to proceed smoothly. Examples of the water-soluble manganese compound include manganese nitrate, and salts of manganese and acetyl acetone, oleic acid, naphthenic acid and the like. Of these, manganese nitrate is preferred because of its availability. The manganese dioxide is preferably formed at a rate which corresponds to 30 to 70% of a capacitance of a final capacitor. The manganese dioxide layer may be in the form of a continuous layer or as islands or spots.

A conductive polymer film is then formed on the manganese dioxide film. If the positive lead electrode 2 is used as an electrode for polymerization and a potential is applied between the electrode 2 and a counter electrode placed in a solution for polymerization, electrolytic polymerization does not take place because of the presence of the anodized dielectric film 3.

In order to cause polymerization to start, an electrode 8 is set in contact with the manganese dioxide film 4 and placed in a polymerization reaction vessel 10. In the vessel 10, a counter electrode 9 is provided as separated from the electrode 8 as shown in FIG. 3. The vessel 10 accommodates therein an electrolytic polymerization solution 11 consisting of an electrolytically polymerizable monomer and a support electrolyte as set forth above. In this arrangement, when a potential which is higher than a potential for polymerization is applied between the electrode 8 and the counter electrode 9, a polymer film is first formed on the electrode 8, from which the conductive polymer film gradually grows toward the manganese dioxide film.

For the electrolytic polymerization, a plurality of electrodes 8 may be provided in order to facilitate the polymerization. The counter electrode 9 may be located at any position provided that it is separated from the electrode or electrodes 8. Preferably, the electrode 8 should be smaller in size than the counter electrode 6.

The electrolytic polymerization solution 11 consists of an electrolytically monomer and a support electrolyte as discussed before. The monomer and electrolyte are usually dissolved in an organic solvent in amounts of 0.1 to 1 moles/liter and from 0.01 to 0.5 moles/liter, respectively. The solvent may be any inert compounds capable of dissolving both the monomer and electrolyte. Examples of such solvents include water and nonaqueous polar solvents such as acetonitrile, propylene carbonate, γ-butyrolactone, dimethylformamide and the like. The polymerizable monomer yields a conductive polymer by oxidation polymerization.

After the polymer film has fully covered the surface of the manganese dioxide film 4, the polymerization reaction is stopped, followed by washing the polymer film on the surface thereof to remove unreacted monomer, the electrolyte and unstable oligomers. For the washing, a solvent which is easy to dry is used including, for example, water, alcohols, acetonitrile, ketones or the like.

A negative lead electrode for the capacitor is attached to the conductive polymer film by means of a carbon paste or silver paste. The resultant capacitor element may be covered with a resin such as an epoxy resin. Finally, the covered element is aged, for example, by application of a potential of 20 volts at a normal normal temperature for several hours.

As described before, it is difficult to directly form the electrolytic polymerization product on the valve metal foil having the anodized or oxide film. However, we have found that when manganese dioxide is deposited on the anodized film even in the form of islands, the electrolytic polymerization reaction proceeds smoothly from the electrode 8 or a portion or portions where a current density is high. Once the reaction starts to occur, the polymer grows from the electrode or the portion to entirely cover the surface of the anodized film. Accordingly, after the growth of the polymer over the entire surface, the portion or portions at which the polymerization has started are removed. As a result, a capacitor which is reduced in current leakage can be obtained. The manganese dioxide brings about the repairing ability.

The capacitor of the invention is advantageous in that the conductive polymer film can be formed at room temperature at a low potential as will be different from the cases where solid electrolytes such as manganese dioxide or TCNQ salts are formed on an anodized film by repeating a high temperature treatment. As a consequence, the capacitor suffers little deterioration of the anodized film with a high withstand voltage.

In addition, the conductive polymer serves as an electrolyte with good conductivity, so that good high frequency characteristics are ensured. The good adhesion between the conductive polymer film and the anodized film through the manganese dioxide layer results in a capacitor having good low temperature and high temperature storage life. The conductive polymer film is formed on the anodized film as a thin film, making it possible to fabricate a thin capacitor. According to the method of the invention, the conductive polymer film is formed even in the pits formed by etching the valve metal surface in order to enlarge the surface area. Hence, a very high capacitance which is not less than 90% of the theoretical can be readily obtained.

As having described the manufacture of the solid electrolytic capacitor, if, however, the anodized oxide 3 has defects, the conductive polymer film tends to grow from the defective portions or to grow into the depth of etched pits where the foil is exposed. These portions will cause an increase of leakage current and a lowering of withstand voltage. In the practice of the invention, it is preferred that prior to the formation of the conductive polymer film, a polymer film is first formed by reduction polymerization. This polymer film is not conductive in nature. More particularly, an electrolytic polymerization solution consisting of a monomer such as an acrylic ester, a methacrylic ester, methacrylonitrile, methacrylamide, acrylonitrile or acrylamide is placed in the polymerization reaction vessel 10 of FIG. 3. In this solution, the valve metal foil 1 having the anodized film 3 on which the manganese dioxide film 4 has been formed is immersed as shown. In this condition, a positive potential is applied to the counter electrode 9 and a negative potential is applied to the electrode 8, thereby causing a polymer film by electrolytic reduction polymerization to grow on the manganese dioxide film.

Subsequently, an electrolytic polymerization solution consisting of pyrrole, thiophene or derivatives thereof and a support electrolyte as stated before is placed by substitution with the above monomer solution. Subsequently, the non-conductive polymer film-formed valve metal foil is immersed in the electrolytic polymerization solution under which a potential which is not lower than a polymerization potential is applied between the electrode 8 and the counter electrode 9, thereby forming a conductive polymer film at the electrode 8. From the electrode 8, the film grows toward the manganese dioxide film 4. During the course of the polymerization, the cations are removed from the non-conductive polymer film 7, if present, thereby rendering the film 7 high in resistance. Accordingly, the conductive polymer film is formed at the defective portions of the anodized film 3, thus suppressing an increase of leakage current and a lowering of withstand voltage to a substantial extent.

In the method of the invention, after the formation of conductive polymer film with or without formation of the non-conductive polymer film, the anodized film 3 can be subjected to chemical conversion retreatment. This retreatment may be effected through the conductive polymer film in a dilute solution of not larger than 1% of a carboxylic acid such as adipic acid or salicylic acid. This chemical conversion retreatment of the anodized film after the formation of the conductive polymer film is very advantageous in lowering a percent defect owing to the leakage current, with an improved yield of the manufacture of the capacitor.

In accordance with a further embodiment of the invention, there is also provided a method for manufacturing a solid electrolytic capacitor in which the conductive polymer film 5 is formed entirely on the capacitor element C except for the positive electrode 2 by separation with an insulating member. The procedure of this method is described in FIGS. 4a, 4b, 5 and 6.

Similar to the embodiment shown in FIGS. 2 to 3, a valve metal foil 1 having a positive lead electrode 2 is first provided and etched to increase the surface area. This foil is anodized to form an oxide film 3.

Figure 4A:
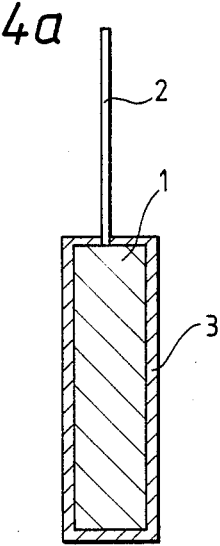
FIGS. 4a, 4b and 5 are, respectively, illustrative of a procedure of manufacturing a solid electrolytic capacitor according to another embodiment of the invention.
Figure 4B:
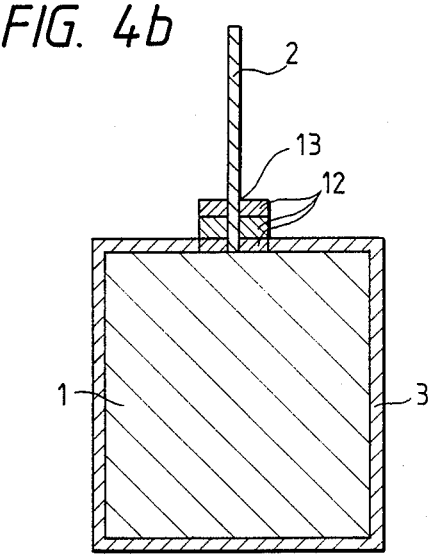

In this embodiment, at least three insulating plates 12 of any desired form each having a through-hole 13 adapted for the positive lead electrode 2 are inserted with the electrode 2 so that the lowermost plate 12 is positioned at the connection between the foil 1 and the electrode 2 as shown in FIG. 4b. The insulating plates 12 may be made of a heat-resistant plastic resin. In FIG. 4b, a heat-resistant plastic washer is used.

The anodized film-bearing valve metal foil 1 is immersed completely except for the positive electrode 2 in an aqueous solution of a nitrate compound capable of yielding manganese dioxide by thermal treatment. The nitrate compound is thermally treated, for example, at 200° to 350° C. in air to deposit a manganese dioxide film 4 on the anodized film 3 and on the upper portion of the valve metal foil 1. The deposition of the manganese dioxide is repeated one to four times.

The surface of the positive lead electrode 2 just above the insulating members 12 is rendered high in resistance by means of the manganese dioxide formed thereon after the deposition treatment.

Figure 5:
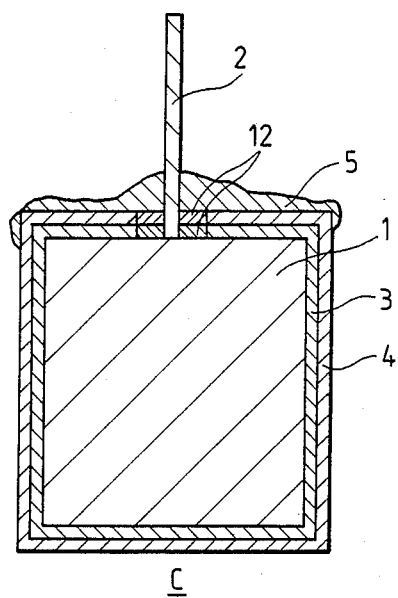

In this state, the outermost insulating member 12 is removed so that the surface portion of the lead electrode 2 near the anodized film 3 is exposed as conductive. This exposed portion is employed as an anode for a subsequent step where a conductive polymer film is formed. This formation is carried out in the same manner as described before with respect to the FIGS. 2 and 3. More particularly, the valve metal foil obtained in the above step is immersed in an electrolytic polyermization solution consisting of a electrolytically polymerizable monomer such as pyrrole, thiophene or a derivative thereof and a support electrolyte, both as defined before. In this case, the exposed electrode is used as an anode as in FIG. 3, whereupon the polymerization starts from the exposed portion of the lead electrode 2 and a polymer film 5 gradually grows along the manganese dioxide film 4. FIG. 5 shows a state where the conductive polymer film 5 is on the way of being formed.

After the conductive polymer film 5 has been formed fully on the manganese dioxide film 4 or between the anodized film 3 and the manganese dioxide film 4, the surface is washed with a solvent and dried. Subsequently, the outer insulating member 12 is removed along with the conductive polymer film deposited on the lead electrode 12. Next, a negative lead electrode 6 is attached to the conductive polymer film 5 through a carbon or silver paste as described before. The resultant capacitor element may be covered with a plastic resin and aged as usual, thereby obtaining a capacitor. This is particularly shown in FIG. 6.

This type of capacitor is significantly improved in humidity resistance since the conductive polymer film completely covers the element except for the insulating member. As a matter of course, the valve metal may be aluminium or tantalum. If required, a non-conductive polymer film as described before may be formed prior to the formation of the conductive polymer film.

The present invention is more particularly described by way of examples. It is to be noted that Examples 1 to 8 deal with a capacitor of the type shown in FIGS. 1 to 3 and Example 9 illustrates a capacitor of the type shown in FIGS. 4 to 6.

EXAMPLE 1

An aluminium foil electrolytically etched with hydrochloric acid was subjected to chemical conversion with oxalic acid to form an anodized film consisting of $Al_2O_3$ on the foil surface. The anodized film-bearing aluminium film was once immersed in an aqueous 30% manganese nitrate solution and then subjected to thermal decomposition treatment in air at 300° C. As a result, it was found that manganese dioxide was deposited as spots or dots on the surface of the anodized film.

On the other hand, an electrolytic polymerization solution was prepared using 0.5 moles/l of a pyrrole monomer and 0.1 mole/l of an ammonium toluenesulfonate electrolyte dissolved in acetonitrile. This solution was placed in a polymerization reaction vessel. As shown in FIG. 3, the aluminium foil having the anodized film and the manganese dioxide layer formed in this order was immersed in the solution. Further, electrodes for the electrolytic polymerization consisting of a platinum wire were provided in contact with the manganese dioxide at the tips thereof. A counter electrode made of a platinum plate was placed in the vessel as separating from the electrodes for the electrolytic polymerization. When a potential of 5 volts was applied between the counter electrode and the electrodes, followed by reaction for about 50 minutes, a polymer film was formed on the electrodes. Thereafter, the polymer film gradually grew from the electrodes toward the manganese dioxide spots. The resultant polymer film was washed with methyl alcohol and dried, followed by attachment of a negative electrode to the conductive polymer film using a colloidal graphite paste. The resultant capacitor element was subjected to measurement of capacitance. As a result, it was found that a rate of a capacitance relative to a capacitance in liquid was 95%. The capacitor has a capacitance of 28 $\mu$F, tan $\delta$ of 3%, an impedande at 100 KHz of 0.2$\Omega$, a withstand voltage of 50 volts, and a leakage current at not larger than 20 volts of not larger than 0.5 $\mu$A.

When the above procedure was repeated using high boiling compounds such as propylene carbonate and $\gamma$-butyrolactone as the solvent and $CO_4^-$, $BF_4^-$ and $PF_6^-$ salts as the electrolyte, similar results were obtained.

EXAMPLE 2

A tantalum capacitor unit using manganese dioxide as a solid electrolyte wherein the chemical conversion treatment with phosphoric acid was effected to form an anodized film was further subjected to thermal decomposition treatment of manganese nitrate twice. This unit was treated to from a conductive polymer film in the same manner as in Example 1. The resultant capacitor was subjected to measurement of capacitor characteristics. The capacitance was 7 $\mu$F at 120 Hz, which was equal to a capacitance in liquid and which was higher than 3 to 4 $\mu$F of a capacitance where a manganese dioxide layer alone was formed on the anodized film twice. The value of tan $\delta$ was 2.8%. The impedance at 100 KHz was 0.07$\Omega$ with a withstand voltage of not less than 50 volts and a leakage current of not larger than 1 $\mu$A at 35 volts.

When the above procedure was repeated using thiophene as the monomer for the electrolytic polymerization, similar characteristics were obtained.

EXAMPLE 3

A 50 micrometer thick tantalum foil was embossed to roughen the surface, followed by chemical conversion with an aqueous phosphoric acid solution at 12 volts to form an anodized film on the foil surface. The anodized foil was immersed in an aqueous 30% manganese nitrate solution and subjected to thermal decomposition of manganese nitrate at 300° C. in air, thereby depositing thermally decomposed manganese dioxide on the anodized film. The above chemical conversion and thermal decomposition procedure was repeated again to obtain a chemically converted tantalum foil having islands of manganese dioxide on the surfaces thereof. This foil was immersed in an electrolytic polymerization solution containing pyrrole, sodium para-toluenesulfonate (hereinafter referred to simply as NaTos) and manganese sulfate, followed by electrolysis in the same manner as in Example 1. The composition of the above electrolyte was selected from 0.2 to 0.5 moles/liter of pyrrole, from 0.1 to 0.8 moles/liter of the sodium p-toluenesulfonate and from 0.1 to 0.8 moles/liter of the manganese sulfate. When the electrolytic potential was set at 3 volts or over, a black polypyrrole film was uniformly formed on the foil through the manganese dioxide islands.

The capacitance after the application of the manganese dioxide was 0.2 $\mu$F at 120 Hz and its rate to the theoretical capacitance was 55%. In contrast, when the polypyrrole film was formed, the capacitance at 120 Hz was 1.9 $\mu$F with a rate to the theoretical of 90%. The impedance at 100 KHz was 0.1$\Omega$, which was 1/10 of a capacitor having manganese dioxide alone applied seven times. The withstand voltage was 45 volts and a leakage current at 15 volts was less than 0.1 $\mu$A. These values are significantly higher than 30 volts and 0.9 $\mu$A of a capacitor using manganese dioxide alone, respectively. This is considered as follows: the polypyrrole-$MnO_2$ complex obtained by the electrolytic polymerization has a high electric conductivity of from 1 to 100 S/cm and high anodizability (film repairing ability).

EXAMPLE 4

An aluminium foil having an area of 20 mm $\times$ 10 mm, which had been electrolytically etched with hydrochloric acid and subjected to chemical conversion, was once applied with a manganese nitrate solution and thermally decomposed to form a manganese dioxide layer on the anodized film. The resultant manganese dioxide layer was very thin and discontinuous. This foil was immersed in an aqueous electrolytic polymerization solution containing 0.5 moles/liter of pyrrole and 0.5 moles/liter of NaTos and treated in the same manner as in Example 1. As a result, the entire surface of the foil was covered with a polypyrrole in about 40 minutes. The resultant capacitor had a capacitance at 120 Hz of 3.6 $\mu$F with a rate to the theoretical of 83% and a value of tan $\delta$ of 2.1%. The impedance at 100 KHz was 0.08$\Omega$.

An aluminium foil having a manganese dioxide layer on the surface thereof and obtained in a manner similar to the above procedure was immersed in an electrolytic polymerization solution consisting of 0.4 moles/liter of pyrrole, 0.4 moles/liter of NaTos, 0.4 moles/liter of manganese nitrate and water, subjected to electrolytic polymerization. At a potential of from 3.5 to 5.5, the entire surface of the foil was covered with a polypyrrole film or a polypyrrole-manganese dioxide complex in about 15 minutes. The capacitance, loss and impedance of the resultant capacitor were similar to those of the case where no manganese nitrate was added, but the withstand voltage was raised from 10 volts to 50 volts.

EXAMPLE 5

In the same manner as in Example 4, an etched aluminium foil having a discontinuous manganese dioxide layer on the surface was made. This foil was immersed in an electrolytic polymerization solution consisting of thiophene, sulfonated polystyrene, manganese sulfate and water and subjected to electrolytic polymerization in the same manner as in Example 1. The resultant capacitor had a capacitance of 3.2 $\mu$F and a tan $\delta$ value of 2.5% at 120 Hz. The impedance at 100 KHz was 0.2$\Omega$. The lowering of the electric conductivity was considered to result from the incorporation of the sulfonated polystyrene. However, this system may be used to constitute a capacitor.

From the results of Examples 1 to 5, it will be seen that conductive polymer films can be readily grown when manganese dioxide is deposited on an anodized film of aluminium or tantalum and that the resultant capacitor has good frequency characteristics, withstand voltage and life.

EXAMPLE 6

An aluminium foil which had been ordinarily etched and had ratings of 16 V and 10 $\mu$F was employed. The foil was anodized in an aqueous adipic acid solution, after which it was immersed in an aqueous 30% manganese nitrate solution, followed by thermal decomposition at 270° C. in air for 5 minutes. Separately, an electrolytic polymerization solution composed of 0.5 moles/liter of pyrrole, 0.1 mole/liter of tetraethylammonium p-toluenesulfonate and acetonitrile was prepared. An electrode from which the electrolytic polymerization starts was made of a platinum wire. A potential of 5 volts was applied between the electrode and a cathode to carry out the electrolytic polymerization reaction thereby forming a conductive polymer film on the manganese dioxide layer. Thereafter, the polymer film was washed with an alcohol and dried. Next, a colloidal graphite paste was applied onto the entire surface of the polymer film and a negative lead electrode was attached to the polymer film by the use of a silver paste. Finally, an epoxy resin was used to cover the capacitor elemente. The leakage current was reduced to 0.5 μA. Finally, the capacitor was aged by application of 20 volts in air for 2 hours.

The capacitor was subjected to measurement of capacitor characteristics with the results shown in the following table wherein the values indicated are averages of five samples, respectively. It will be noted that a capacitance in liquid was 120 Hz.

TABLE 1

| 120 Hz | | 1 KHz | | Leakage current 16 V | ESR (series resistance) at 500 KHz |
|---|---|---|---|---|---|
| C | tan δ | C | tan δ | | |
| 9.5 μF | 2.5% | 8.8 μF | 3.8% | 0.5 μA | 30 m Ω |

As will be apparent from the above table, the capacitance at 120 Hz is 9.5 μF which is very high when compared with a value of 7 μF of an ordinary TCNQ salt capacitor. The series resistance at 500 KHz is very small as 30 mΩ on comparison with those values of other types of aluminium electrolytic capacitors, thus being excellent in high frequency characteristics. In addition, the leakage current is as small as 0.5 μA.

Moreover, when the capacitor was allowed to stand at 125° C. for 500 hours under load-free conditions, the capacitance was reduced by about −2% but the other characteristics were not varied at all.

When the above procedure was repeated using instead of the Al foil a Ta sintered product, there were obtained characteristic properties substantially equal to those of a capacitor wherein manganese oxide was treated seven times.

EXAMPLE 7

An aluminium foil which had been ordinarily etched and had ratings of 16 V and 16 μF was employed. The foil was anodized in an aqueous adipic acid solution to form an oxide film of Al₂O₃, after which it was immersed in an aqueous 30% manganese nitrate solution, followed by thermal decomposition at 270° C. in air for 5 minutes. Separately, an electrolytic reduction polymerization solution composed of 0.5 moles/liter of methyl methacrylate, 0.1 mole/liter of tetraethylammonium perchlorate and acetonitrile was prepared. Further, an electrolytic oxidation polymerization solution composed of 0.5 moles/liter of pyrrole, 0.1 mole/liter of tetraethylammonium p-toluenesulfonate and acetonitrile was prepared.

The manganese dioxide-bearing aluminium foil was immersed in the electrolytic reduction polymerization solution. A platinum wire was used as an electrode from which the polymerization started and a platinum plate was used as a counter electrode, between which a potential of 7 volts was applied in order to effect the electrolytic reduction polymerization for 5 minutes, thereby forming a polymer film on the manganese dioxide layer. This polymer film was washed with an alcohol. Thereafter, the resultant foil was further immersed in the electrolytic oxidation polymerization solution and the polymerization reaction was effected for 30 minutes using the same electrode arrangement as used for the electrolytic reduction polymerization, thereby forming a conductive polymer film on the first polymer film. The conductive polymer film was washed with an alcohol and dried. Subsequently, a colloidal graphite paste was applied to the conductive polymer film and a negative lead electrode was attached to the conductive polymer film by the use of a silver paste, following by covering with an epoxy resin. Finally, the resultant capacitor was aged by application of a potential of 20 volts at 80° C. for 2 hours.

The capacitor had characteristic properties shown in the following table. The results of the table are average values of ten samples and a capacitance in liquid was 10 μF at 120 Hz.

TABLE 2

| 120 Hz | | 1 KHz | | Leakage current 16 V | ESR (series resistance) at 500 KHz |
|---|---|---|---|---|---|
| C | tan δ | C | tan δ | | |
| 9.3 μF | 2.1% | 8.7 μF | 3.5% | <0.2 μA | 30 m Ω |

These results are very good similar to those results in Table 1. In addition, if the non-conductive polymer film obtained by the electrolytic reduction polymerization is not formed, two or three capacitors among 10 capacitor samples are on the order of mA with respect to the leakage current and some capacitors are broken down at a withstand voltage of not larger than 16 volts. When the non-conductive film is formed, such defective capacitors are not found with an improved yield.

As will be apparent from this example, an electrolytic capacitor which comprises a valve metal member with an anodized film, and a manganese dioxide layer, a non-conductive layer formed by electrolytic reduction polymerization on at least part of the manganese dioxide layer and a conductive polymer layer formed by electrolytic oxidation polymerization which are formed on the anodized film in this order and which exhibits good high frequency characteristics, a low leakage current and a high withstand voltage, can be obtained in high yield.

EXAMPLE 8

An aluminium foil etched in an ordinary manner and having ratings of 16 volts and 10 μF was subjected to chemical conversion with an aqueous adipic acid to form an anodized film consisting of Al₂O₃ on the foil surface. The anodized film-bearing aluminium film was immersed in an aqueous 30% manganese nitrate solution and then subjected to thermal decomposition treatment in air at 270° C. for 10 minutes to form a manganese dioxide layer on the surface of th anodized film.

On the other hand, an electrolytic polymerization solution comprised of 0.5 moles/l of a pyrrol monomer and 0.1 mole/l of tetraethylammonium p-toluenesulfonate dissolved in acetonitrile was placed in a polymerization reactor. The aluminium foil having the anodized film and the manganese dioxide layer formed in this order was immersed in the solution as shown in FIG. 3. Then, a potential of not less than 5 volts which was higher than a potential for polymerization was applied between positive and negative electrodes, thereby causing the polymerization to proceed for 15 minutes. As a result, a conductive polymer film could be grown from the positive electrode toward the manganese dioxide layer. After complete coverage of the manganese oxide layer with the conductive polymer film, the electrolytic polymerization reaction was completed. Thereafter, the surface of the conductive polymer film was washed with ethanol and dried. After the formation of the polymer film on the manganese dioxide layer, the anodized film was again chemically treated in an aqueous 0.5% adipic acid solution. After the chemical retreatment, the aluminium foil was applied with a potential in a stepwise manner up to 20 volts relative to the negative electrode. The current passing during the application of the potential gradually reduced. When the current was saturated, the application of the potential was stopped. Thereafter, the capacitor was washed with pure water and dried.

Subsequently, a colloidal graphite paste was applied entirely onto the conductive polymer film, to which a negative lead electrode was attached through a silver paste. The resultant capacitor element was covered with an epoxy resin except for the electrodes and aged by application of 20 volts at normal temperatures for 2 hours.

The characteristic properties of solid electrolytic capacitors with or without the retreatment of chemical conversion are shown in Table 3. Ten samples for the respective measurements were used.

TABLE 3

| | Retreatment of Chemical Conversion | | | | | No Retreatment | | | | |
|---|---|---|---|---|---|---|---|---|---|---|
| | 120 Hz | | 1 KHz | | | 120 Hz | | 1 KHz | | |
| | C µF | tan δ % | C µF | tan δ % | LC µA | C µF | tan δ % | C µF | tan δ % | LC µA |
| Initial Characteristic | 9 | 0.8 | 8.5 | 3 | <0.3 | 9 | 0.7 | 8.7 | 2.8 | <1 |
| After 500 Hrs. at 125° C. | 8.8 | 1 | 8.3 | 3.5 | <0.5 | 8.8 | 0.8 | 8.3 | 3.3 | <100 for 3 samples 1~100 for 4 samples <1 for 3 samples |

When the above procedure was repeated using water instead of the organic solvent as a solvent for electrolytic polymerization and/or also using, as the electrolyte, aromatic sulfonates such as naphthalenesulfonates instead of the toluenesulfonate, similar results were obtained.

As will become apparent from the above example, the retreatment of the chemical conversion of the anodized film after the formation of the conductive polymer film can suppress a defective percent owing to the leakage current, thus leading to an improved yield of the capacitors.

EXAMPLE 9

Figure 6:
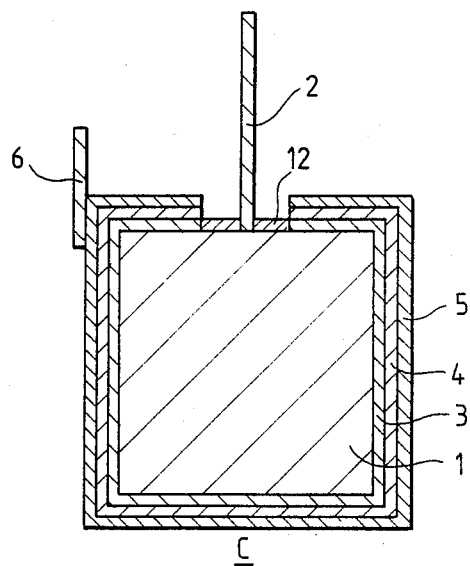
FIG. 6 is a schematic view showing a solid electrolytic capacitor obtained by the method shown in FIGS. 4a, 4b and 5.

This example illustrates fabrication of a solid electrolytic capacitor as shown in FIG. 6.

A square unit of a tantalum capacitor etched in an ordinary manner and having ratings of 16 volts and 7 µF was used as a tantalum foil. This foil was chemically converted to form an oxide film consisting of $Ta_2O_5$ and was attached with a lead electrode. The lead electrode was inserted at the connection with the tantalum foil with three teflon washers each having an opening at the center thereof. In this state, the tantalum foil was subjected to a procedure of immersing it in an aqueous manganese nitrate solution and thermally decomposing the manganese nitrate at 300° C. once, twice, three times, four times or seven times, thereby forming a manganese dioxide layer or film on the anodized film.

The outermost washer was removed from each foil, followed by electrolytic polymerization under the following conditions to entirely form a conductive polymer film on the manganese dioxide film.

An electrolytic polymerization composition was composed of 0.5 moles/liter of pyrrole and 0.1 mole/liter of tetraethylammonium p-toluenesulfonate dissolved in acetonitrile. A counter electrode used was a Pt electrode and a potential for the positive electrode was set at 3 to 5 volts. The polymerization reaction was continued for 30 to 120 minutes.

The results polymer film was washed with an alcohol and dried, after which the outer washer was removed by which the insulation between the lead electrode and the conductive polymer film could be achieved. After application of a carbon paste onto the conductive polymer film, a negative lead electrode was attached to the conductive polymer film through a silver paste. The resultant capacitors were subjected to measurement of capacitor characteristics with the results shown in Table 4 below.

For comparison, the above procedure was repeated except that no conductive polymer film was formed.

TABLE 4

| Procedures of | Number of Thermal Decomposition | | | | |
|---|---|---|---|---|---|
| Manganese Nitrate | 1 | 2 | 3 | 4 | 7 |
| No Conductive Polymer Film: | | | | | |
| 120 Hz  C(µF) | — | — | 5.2 | 6.7 | 7.1 |
| tan δ (%) | — | — | 12 | 10 | 51 |
| 1 KHz  C(µF) | — | — | 4.5 | 6.0 | 6.7 |
| tan δ (%) | — | — | 25 | 21 | 15 |
| Conductive Polymer Film Formed: | | | | | |
| 120 Hz  C(µF) | 5 | 5.8 | 6.8 | 7.1 | — |
| tan δ (%) | 8 | 6 | 4.8 | 4.5 | — |
| 1 KHz  C(µF) | — | — | 6.3 | 6.8 | — |
| tan δ (%) | — | — | 9.8 | 9 | — |

The results of the above table reveal that the capacitors of the invention using the conductive polymer films are higher in capacitance and lower in the value of tan δ, making it possible to reduce the number of the thermal decomposition operations of manganese nitrate.

In order to evaluate moisture proofing, the capacitors were not covered with a plastic resin and allowed to stand under conditions of 40° C. and 90% R.H. As a result, it was found that the conductive polymer film-free capacitors increased in the value of tan δ with a reduction of leakage current within 24 hours. On the contrary, the capacitors of the invention using the conductive polymer film kept the initial characteristics over 50 hours.

As will be apparent from the above example, since at least three insulating plates are provided at the contact portion of the valve metal foil and the positive lead electrode. The lead electrode is used as one of electrodes for the electrolytic polymerization reaction. Thus, a conductive polymer film can be formed very simply on a manganese dioxide layer. In addition, the capacitor is substantially entirely covered with the polymer film, so that not only good capacitor characteristics, but also good moistureproofing can be obtained.

What is claimed is:

1. A solid electrolytic capacitor which comprises a capacitor element including a valve metal member capable of forming a dielectric oxide film thereon, a dielectric oxide film formed on the valve metal member, a manganese dioxide layer formed on the dielectric oxide film, a conductive polymer film formed on the manganese dioxide layer by electrolytic polymerization, and terminals formed on the valve metal member and the conductive polymer film, respectively.

2. The solid electrolytic capacitor according to claim 1, wherein said valve metal member is made of a metal selected from the group consisting of aluminium and tantalum.

3. The solid electrolytic capacitor according to claim 1, wherein said conductive polymer film is obtained by electrolytic oxidation polymerization of a monomer selected from the group consisting of pyrrole, thiophene and derivatives thereof.

4. The solid electrolytic capacitor according to claim 3, wherein said monomer is pyrrole.

5. The solid electrolytic capacitor according to claim 3, wherein said monomer is thiophene.

6. The solid electrolytic capacitor according to claim 1, wherein said manganese dioxide layer is in the form of islands.

7. The solid electrolytic capacitor according to claim 1, wherein said manganese dioxide layer is a continuous layer.

8. The solid electrolytic capacitor according to claim 1, wherein one of the terminals is attached to the conductive polymer film through a conductive layer formed on said conductive polymer film.

9. A method for manufacturing a solid electrolytic capacitor, which method comprises providing a valve metal member, forming an anodized film on the valve metal member, forming a manganese oxide film on the anodized film, subjecting a monomer capable of forming a conductive polymer to electrolytic polymerization thereby forming a conductive polymer film on the manganese oxide film, and attaching terminals to the valve metal member and the conductive polymer film, respectively.

10. The method according to claim 9, wherein the anodized film-bearing valve metal member is immersed in an aqueous solution of a manganese compound capable of yielding manganese dioxide by thermal treatment and the immersed member is thermally treated at 200° to 350° C. in air to cause manganese dioxide to be deposited on the anodized film as a layer.

11. The method according to claim 10, wherein said manganese compound is manganese nitrate.

12. The method according to claim 10, wherein said manganese dioxide is formed as islands on the anodized film.

13. The method according to claim 9, wherein said conductive polymer film is formed by immersing the valve metal member after the formation of the manganese oxide layer in an electrolytic polymerization solution comprising a monomer and a support electrolyte and a potential necessary for the electrolytic polymerization is applied between at least one electrode provided in contact with the manganese dioxide layer and a counter electrode provided in the solution and electrically separated from the first-mentioned electrode.

14. The method according to claim 13, wherein a plurality of electrodes are provided in contact with the manganese dioxide layer.

15. The method according to claim 9, wherein said valve metal member is made of tantalum.

16. The method according to claim 9, wherein said valve metal member is made of aluminium.

17. The method according to claim 9, wherein said monomer is a member selected from the group consisting of pyrrole, thiophene and derivatives thereof.

18. The method according to claim 9, wherein the manganese dioxide is deposited on the anodized film at a rate of 30 to 70% of a final capacitance, after which the conductive polymer film is formed on the manganese dioxide layer.

19. The method according to claim 9, further comprising aging the capacitor by application of an appropriate potential to the terminals.

20. A solid electrolytic capacitor including a valve metal member capable of forming a dielectric oxide film thereon, a dielectric oxide film formed on the valve metal member, a manganese dioxide layer formed on the dielectric oxide film, a non-conductive polymer film formed on the manganese dioxide layer, a conductive polymer film formed on the non-conductive polymer film, and terminals formed on the valve metal member and the conductive polymer film, respectively.

21. The solid electrolytic capacitor according to claim 20, wherein said non-conductive polymer film is made of a polymer of an acrylic ester, a methacrylic ester, acrylonitrile or acrylamide.

22. A method for manufacturing a solid electrolytic capacitor, which method comprises providing a valve metal member, forming an anodized film on the valve metal member, forming a manganese oxide film on the anodized film, forming a non-conductive polymer film on the manganese dioxide film, subjecting a monomer capable of forming a conductive polymer to electrolytic polymerization thereby forming a conductive polymer film on the non-conductive polymer film, and attaching terminals to the valve metal member and the conductive polymer film, respectively.

23. A method for manufacturing a solid electrolytic capacitor, which method comprises providing a valve metal member, forming an anodized film on the valve metal member, forming a manganese oxide film on the anodized film, subjecting a monomer capable of forming a conductive polymer to electrolytic polymerization thereby forming a conductive polymer film on the manganese oxide film, re-anodizing the anodized film, and attaching terminals to the valve metal member and the conductive polymer film, respectively.

24. A method for manufacturing a solid electrolytic capacitor, which method comprises providing a valve metal member having a positive lead electrode and at least three insulating members, each of said at least three insulating members having an opening through which the positive lead electrode is inserted to position the at least three insulating members at the connection of the lead electrode with the valve metal member; forming an anodized film over the entire valve metal member and the three insulating members; forming a manganese oxide film on the anodized film; removing at least one insulating member to expose a portion of the lead electrode; subjecting a monomer capable of forming a conductive polymer to electrolytic polymerization thereby forming a conductive polymer film on the manganese oxide film, said electrolytic polymerization being carried out by application of the necessary potential between the lead electrode and a counter electrode electrically separated from the lead electrode; removing all but the lowermost of the insulating members, the lowermost insulating member ensuring electric insulation between the lead electrode and the conductive polymer film; and attaching a terminal to the conductive polymer film.

25. The method according to claim 24, wherein said valve metal member is made of tantalum.

* * * * *